United States Patent
Vaughnn

(10) Patent No.: US 7,192,173 B2
(45) Date of Patent: Mar. 20, 2007

(54) OPTICAL THROUGHPUT CONDENSER

(75) Inventor: David Vaughnn, Edina, MN (US)

(73) Assignee: Rudolph Technologies, Inc., Flanders, NJ (US)

( * ) Notice: Subject to any disclaimer, the term of this patent is extended or adjusted under 35 U.S.C. 154(b) by 139 days.

(21) Appl. No.: 10/622,847

(22) Filed: Jul. 18, 2003

(65) Prior Publication Data

US 2004/0057135 A1    Mar. 25, 2004

Related U.S. Application Data

(60) Provisional application No. 60/397,514, filed on Jul. 18, 2002.

(51) Int. Cl.
*D03D 15/00* (2006.01)

(52) U.S. Cl. ....................................... 362/558; 369/858

(58) Field of Classification Search ................ 362/556, 362/554, 558; 359/858
See application file for complete search history.

(56) References Cited

U.S. PATENT DOCUMENTS 6,299,328 B1 * 10/2001 Wilson ........................ 362/223
6,759,814 B2 * 7/2004 Vogel et al. ................. 315/312

* cited by examiner

*Primary Examiner*—John Anthony Ward
(74) *Attorney, Agent, or Firm*—Dicke, Billig & Czaja, PLLC

(57) ABSTRACT

An optical throughput condenser re-concentrates light thereby causing light which otherwise would be wasted outside of the useful AΩ product, also known as optical throughput, of an illuminating system to be redirected back into the useful AΩ product. The optical throughput condenser includes a thin film having an angle gate such that light striking the surface with a range of incident angles such that the angle of incident is less than or equal to the gate angle ($\Theta_{GATE}$) transmits through the thin film. Light striking the surface with a range of incident angles such that the angle of incident is grater than the gate angle. reflects back from the thin film. An integrating sphere is positioned such that light reflecting back from the thin film is directed towards the integrating sphere so that the light is redirected towards the angle gate.

22 Claims, 3 Drawing Sheets

OPTICAL THROUGHPUT CONDENSER

CROSS-REFERENCE TO RELATED APPLICATIONS

This application cross-references and incorporates by reference U.S. Provisional Patent Application No. 60/397,514, filed on Jul. 18, 2002 and entitled "Throughput Condenser".

BACKGROUND

1. Technical Field

The present invention relates to an optical throughput condenser that re-concentrates light. More specifically, the invention overcomes illumination inefficiencies by causing light which otherwise would be wasted outside of the useful optical throughput $A\Omega$ of an illuminating system be redirected back into the useful $A\Omega$.

2. Background Information

In an illumination or optical system, "throughput" means optical throughput. At any position within an optical system, optical throughput equals the product of the beam area (A) and the solid angle $\Omega$ subtended. Optical throughput or $A\Omega$ product is also sometimes referred to as the French word "étendue" or "etendue".

Traditionally, the $A\Omega$ product is constant or invariant in all optical or illumination systems. It cannot be lost or gained; it is preserved. In optical or illumination systems, light beams can be modified by various elements such as lenses and mirrors. Both the beam area and angular substance can be modified. However, the product of the beam area and the angular substance is always constant or invariant. This is the $A\Omega$ product.

The intention or goal of an illumination system is to get some amount of light from a particular source to a particular object in need of illumination. It is understood, similar to general optical systems, the $A\Omega$ product is invariant in illumination systems. In reality, however, it is often the case that efficiency is actually lost due to factors such as system absorption.

Since it is well known that the $A\Omega$ product ultimately limits performance of illumination or optical systems, it is desirable to discover systems and methods to increase the $A\Omega$ product for illumination or optical systems.

SUMMARY

The present invention is an optical throughput condenser that re-concentrates light. The optical throughput condenser overcomes illumination inefficiencies by causing light which otherwise would be wasted outside of the useful $A\Omega$ product of an illumination system to be redirected back into the useful $A\Omega$ product.

An optical illuminating system of the present invention includes an illuminating source that provides sharply defined angular range of emitted light. Light is emitted from an output port when a thin film dielectric angle gate is deposited on a transmissive substrate. The angle gate has a sharp angularly dependent transmission such that a portion of light striking the thin film with an angle of incidence less than or equal to the gate angle transmits through the thin film and a portion of light striking the thin film with an angle of incidence greater than the gate angle reflects back from the thin film. An integrating sphere is positioned in relationship to the thin film such that the portion of light reflected back from the thin film is directed towards the integrating sphere. The portion of light directed toward the integrating sphere is eventually redirected toward the angle gate. A final product of light of the optical illuminating system equals all light portions striking the thin film and transmitted through the thin film, thereby defining the useful $A\Omega$ product.

BRIEF DESCRIPTION OF THE DRAWINGS

Preferred embodiments of the invention, illustrative of the best mode in which Applicant has contemplated applying the principals, are set forth in the following description and are shown in the drawings and are particularly and distinctly pointed out and set forth in the appended claims.

Similar numerals refer to similar parts throughout the drawings.

DETAILED DESCRIPTION

The present invention is an optical throughput condenser. In general, the invention is a system and method that re-concentrates light. More specifically, the invention is a system and method that causes light which would be otherwise wasted outside of the useful $A\Omega$ product of an optical or illumination system to be redirected back into the useful $A\Omega$ product.

The $A\Omega$ product is equal to the product of beam area A and solid angle $\Omega$. $\Omega$ is based upon the angle of incidence of a surface and is defined as the solid angle $\Omega$ within which a beam of light or a portion of light transmits through a film, rather than reflects back from the film. The beam area A is equal to the surface area of a particular substrate or thin film. The optical throughput condenser of the present invention re-concentrates light which otherwise would be wasted outside of the useful $A\Omega$ product of an illumination system back into the useful $A\Omega$ product by employing and combining two separate techniques. The first technique is a thin film design with a sharp angularly dependent transmission. Light striking a surface with an angle of incidence (AOI) higher than some design value reflects back, away from the thin film. Conversely, light within the AOI transmits through the thin film. The thin film is employed as a gate allowing the portion of light striking the thin film within the AOI to transmit through thin film.

The second technology is an integrating sphere. An integrating sphere is a realization of the ideal perfectly Lambertian, non-absorbing, confined scattering volume. In the present invention, light which does not pass the angle gate of the thin film is directed back into the integrating sphere. Light will randomly bounce around until it is either directed back into the gate or input port, or eventually absorbed by the overall system.

Figure 1:
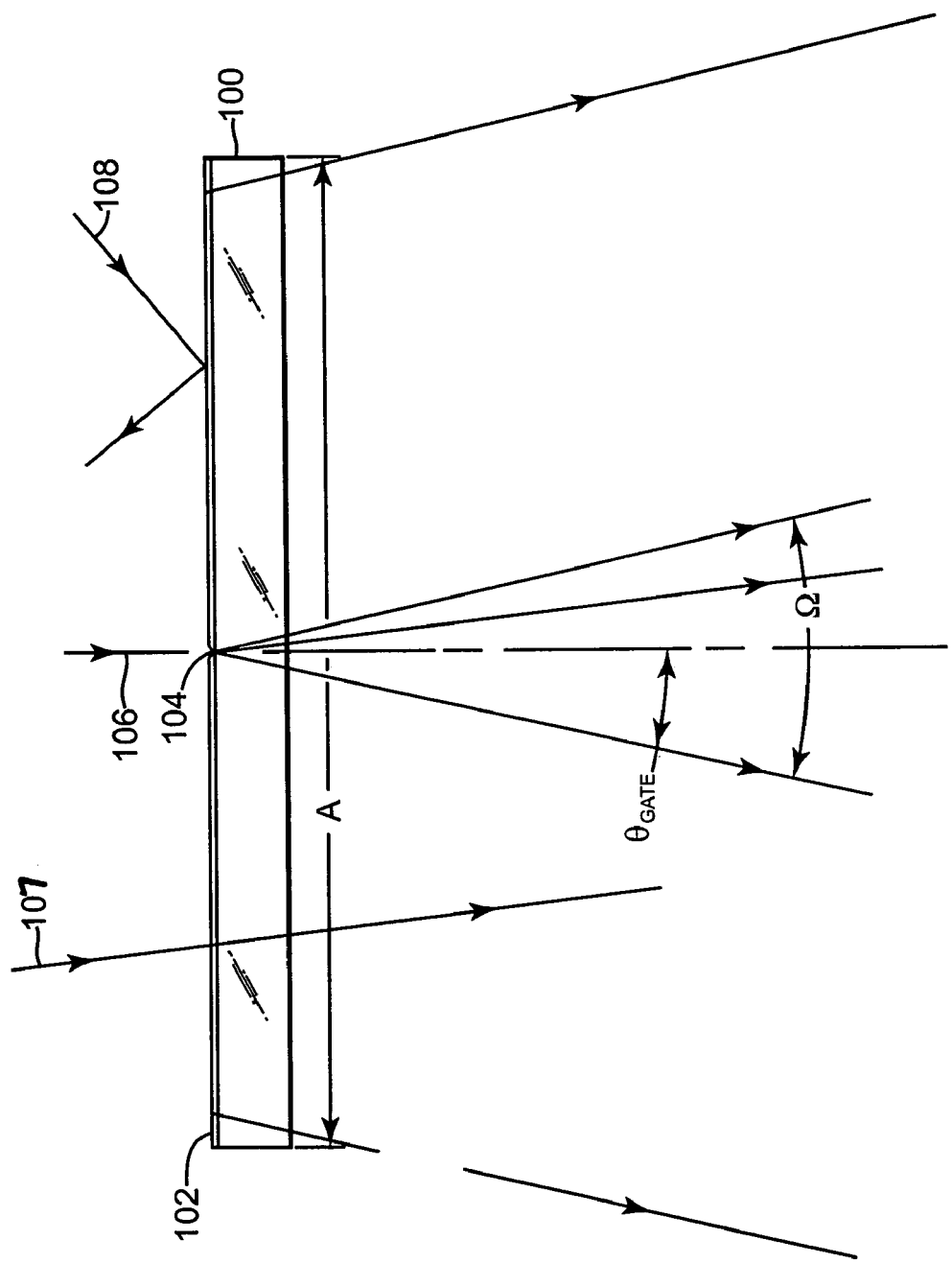
FIG. 1 is a side plane view of a thin film substrate.

FIG. 1 is a side plane view of a thin film. Substrate 100 includes a thin film coating 102 having angle gate 104. Area A is defined as the surface area of thin film coating 102 and/or substrate 100. Thin film coating 102 can be any low absorptive or dielectric design providing a sharp cutoff between reflected and transmitted light at a design AOI. Likewise, substrate 100 can be any substrate capable of efficient transmission, including, but not limited to, fused silica or common optical window materials. $\Omega$ is the solid angle within which a beam or portion of light transmits through substrate 100 and thin film coating 102, rather than reflects back from thin film coating 102. $\Theta_{GATE}$ is the axi-symmetric one-dimensional relationship associated with the solid angle $\Omega$ such that $\Omega=2\pi[1-\cos(\Theta)]$ angle equal to one-half of $\Omega$. Light transmissions having an AOI less than or equal to $\Theta_{GATE}$, such as light transmissions 106 and 107, are transmitted through thin film 102 via angle gate 104 and substrate 100 to a final desired destination. Conversely, beams or portions of light having an AOI greater than $\Theta_{GATE}$, such as light transmission 108, are not transmitted through angle gate 104 and are reflected back away from thin film coating 102 (towards the top of FIG. 1).

In prior art illumination systems, theoretically, all light transmissions similar to light transmission 104 would be transmitted through angle gate 104 of thin film coating to a final desired destination. In a best-case scenario with prior art designs, this would be the case. However, it is understood that some light transmissions are eventually absorbed by the overall system.

Figure 2:
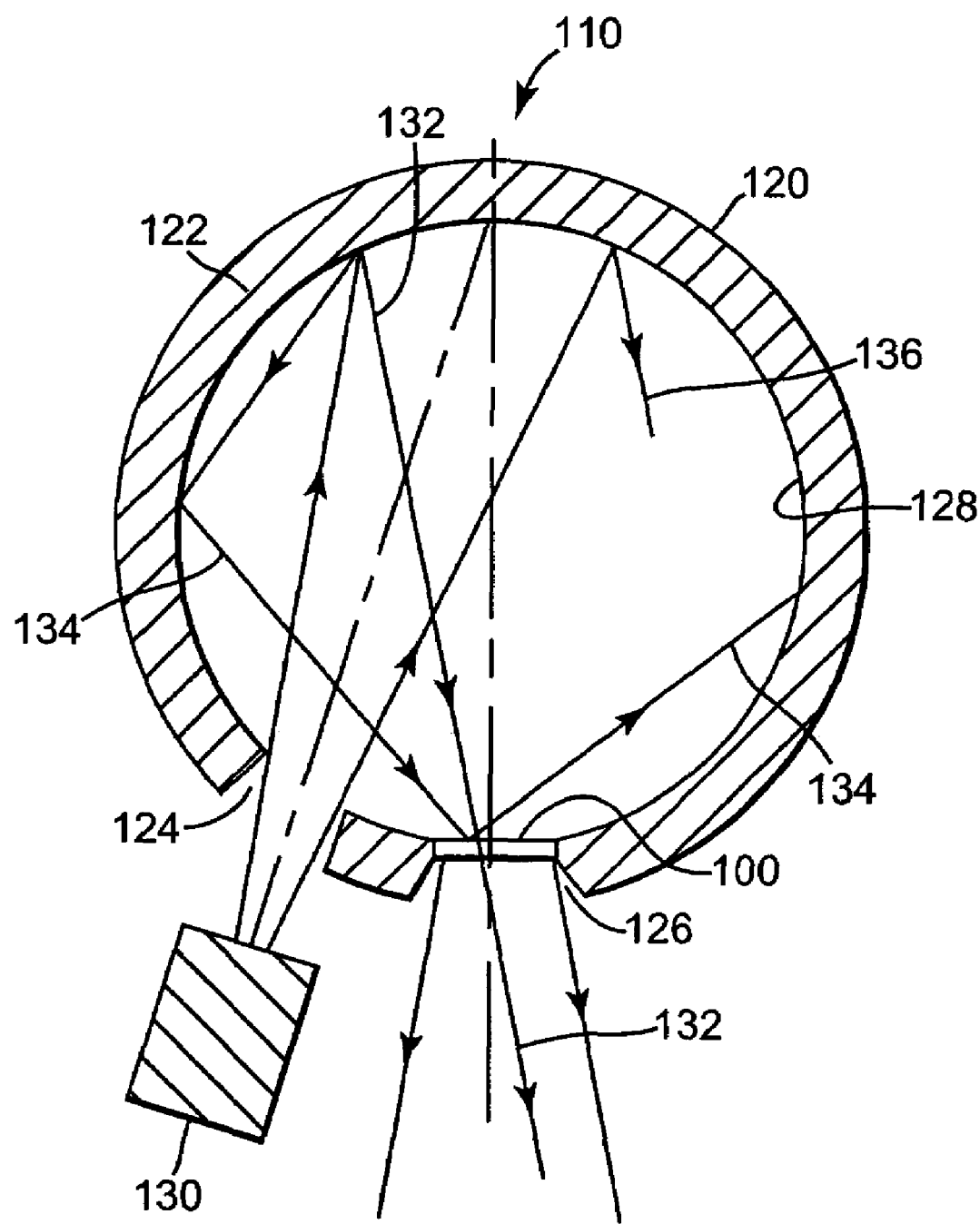
FIG. 2 is a sectional view of the present invention including a thin film substrate and an integrating sphere.

FIG. 2 is a sectional view of the present invention including a thin film and an integrating sphere. FIG. 2 illustrates optical illumination system 110 that incorporates the present invention and includes substrate 100, previously shown in FIG. 1, in conjunction with integrating sphere 120. It is understood that substrate 100, shown in FIG. 2 represents substrate 100 shown in FIG. 1 and is defined by the previous discussion with reference to FIG. 1. Integrating sphere 120 includes sphere 122, input port or gate 124, output port or gate 126, and coating 128. FIG. 2 also includes external illumination source 130, as well as light transmissions or beams of light 132, 134, and 136.

As shown in FIG. 2, external illumination source 130 is capable of transmitting various light transmissions into integrating sphere 120. However, only two such light transmissions are shown in FIG. 2 for clarity purposes. Light transmission will bounce off of the inner surface of sphere 122. At some point, the light transmissions for external illumination source 130 will eventually transmit towards substrate 100 having thin film coating 102 and angle gate 104 (shown in FIG. 1). If a particular light transmission or beam of light strikes thin film coating 102 of substrate 100 at an AOI less than or equal to $\Theta_{gate}$, the light transmission or beam of light will transmit through substrate 100 and thin film 102 via angle gate 104 to a final desired destination. However, if a particular light transmission or beam of light strikes thin film coating 102 of substrate 100 at an AOI greater than $\Theta_{gate}$, the light transmission does not transmit through angle gate 104, but rather is reflected back within integrating sphere 120. The particular light transmission will then bounce off of the inner surface of sphere 122 until it is either absorbed by the system or is again transmits towards thin film 102 and substrate 100. Once again, if the particular light transmission transmits at an AOI less than or equal to $\Theta_{gate}$, the light transmission will transmit through substrate 100 and thin film coating 102 via angle gate 104. Conversely, if the light transmission strikes substrate 100 with an AOI greater than $\Theta_{gate}$, the light transmission will be reflected back within integrating sphere 120 and will again bounce within integrating sphere 120 until it is either eventually absorbed by the system or strikes thin film coating 102 of substrate 100 for another attempt to transmit through substrate 100 and thin film coating 102.

In one embodiment, coating 128 includes micro retro reflectors such as ScotchLight Balls™ to nearly reverse incident redirection. Micro retro reflectors are often used to concentrate light in a particular direction, rather than scattering light in every direction. In particular, the balls reflect light to return back in the direction from whence the light came, no matter what the incident direction or angle. Micro retro reflectors of the present invention are quasi-retro reflectors in that they have some angular spectrum. In other words, if a beam of light or light transmission is shined on the micro retro reflectors of the present invention at a particular angle, a small amount of the light is scattered; however, most of the light reflects back in a direction close to the direction from whence the beam of light came, but not perfectly. The beam of light or light transmission may return slightly off in angularity, such as up 5°. By controlling the diameter, index, and range of site of the micro retro reflectors, the angularity from the incident direction can be controlled. Micro retro reflectors may be incorporated into all portions of coating 128, or may be incorporated into spatially distinct portions of coating 128 to increase efficiency.

Figure 3:
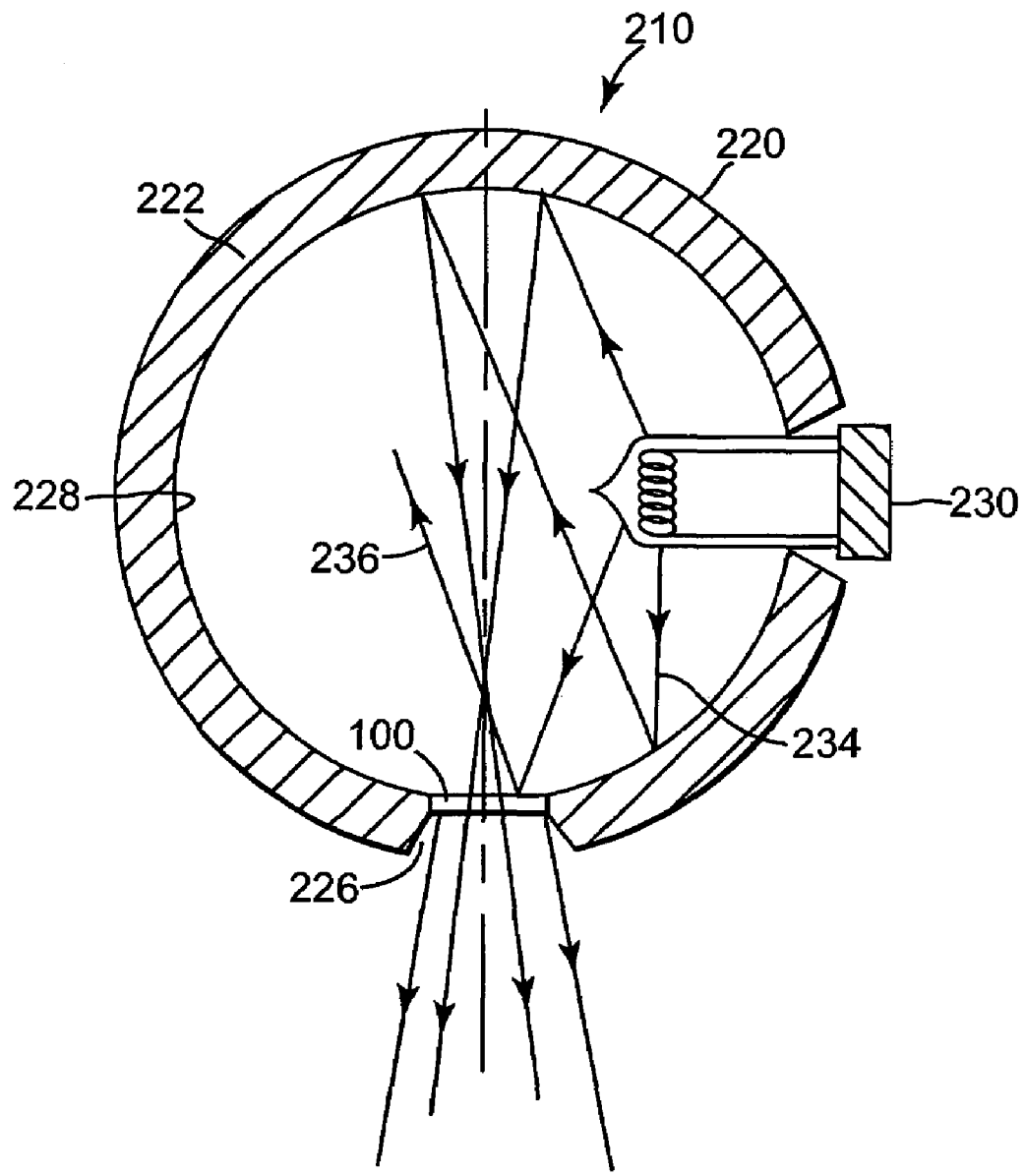
FIG. 3 is a sectional view of an alternate embodiment of the present invention including a thin film substrate and an integrating sphere.

FIG. 3 is a sectional view of an alternate embodiment of the present invention including a thin film and an integrating sphere. FIG. 3 illustrates optical illumination system 210 which includes integrating sphere 220 having sphere 222, output port 226, and coating 228. FIG. 3 also includes internal illumination source 230, as well as light transmissions 232, 234, and 236, and substrate 100, shown and described with reference to FIG. 1.

Optical illumination system 210, shown in FIG. 3 differs from optical illumination system 110, shown in FIG. 2, in that optical illumination 210 includes internal illumination source 230, rather than external illumination source 230. Having internal illumination source 230 does not change the concept of the present invention, however, having an internal illumination system, such as internal illumination system 230, can reduce an escape route (input port or gate 124 of FIG. 2) in which beams of light or light transmissions may escape integrating sphere 220 without reaching the desired final destination. It is understood that optical illumination systems 110, 210 will re-concentrate light to improve the overall light transmissions of an AΩ product.

It is also understood that both an external illumination source and an internal illumination source, such as external illumination source 130, and internal illumination source 230 may be used without varying from the present invention. In addition, any number of internal and/or external illumination sources may be utilized.

The illumination systems and the optical throughput condensers shown and described with reference to FIGS. 1–3 are capable of re-concentrating light such that portions of light or light transmissions which otherwise would be wasted outside of the useful AΩ product of an illumination system are redirected back into the useful AΩ product, thereby increasing the useful AΩ product without increasing either the beam area or angle $\Omega$.

Accordingly, the invention as described above and understood by one of skill in the art is simplified, provides an effective, safe, inexpensive, and efficient device, system and process which achieves all the enumerated objectives, provides for eliminating difficulties encountered with prior devices, systems and processes, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the invention's description and illustration is by way of example, and the invention's scope is not limited to the exact details shown or described.

Having now described the features, discoveries and principles of the invention, the manner in which it is constructed and used, the characteristics of the construction, and the advantageous, new and useful results obtained; the new and useful structures, devices, elements, arrangements, parts and combinations, are set forth in the appended claims.

What is claimed is:

1. An optical illumination system comprising:
an illuminating source capable of providing light transmissions having a range of angles;
a transmissive substrate positioned in proximity to the illuminating source;
a thin film coating positioned on a surface of the transmissive substrate, the thin film coating having a design property of a distinct cutoff between striking reflected and transmitted light transmissions at a gate angle ($\Theta_{GATE}$) such that light transmissions striking the thin film coating at an angle of incidence less than or equal to the gate angle ($\Theta_{GATE}$) transmits through the thin film, while light transmissions striking the thin film coating at an angle of incidence greater than the gate angle ($\Theta_{GATE}$) reflects back from the thin film; and
an integrating sphere encompassing the thin film coating such that light transmissions reflecting back from the thin film are directed within the integrating sphere and subsequently redirected towards the thin film coating.

2. The optical illumination system of claim 1, wherein a final product of light is generated equaling the combination of all light transmission transmitted through the thin film.

3. The optical illumination system of claim 1, and further comprising:
a plurality of micro retro reflectors positioned on a portion of an inner surface of the integrating sphere.

4. The optical illumination system of claim 3, wherein the plurality of micro retro reflectors are positioned on the portion of the integrating sphere to substantially reverse an incident ray direction of the portion of light transmission reflected back from the thin film.

5. The optical illumination system of claim 1, wherein the illuminating source is positioned within the integrating sphere.

6. The optical illumination system of claim 1, wherein the illuminating source is positioned outside of the integrating sphere and further comprising:
at least one additional illuminating source positioned within the integrating sphere.

7. A method of re-concentrating light within an optical illumination system, comprising:
transmitting a series of light transmission from an illuminating source;
directing the series of light transmission towards a thin film positioned on a surface of a transmissive substrate and having a distinct cutoff between striking reflected and transmitted light transmissions at a gate angle ($\Theta_{GATE}$), such that a first portion of the series of light transmissions striking the thin film at an angle of incidence less than or equal to the gate angle ($\Theta_{GATE}$) of the thin film transmits through the thin film and the transmissive substrate, And a second portion of the series of light transmissions striking the thin film at an angle of incidence greater than the gate angle ($\Theta_{GATE}$) of the thin film reflects back from the thin film;
redirecting the second portion of the series of light transmissions towards the thin film; and
generating a final product of light transmissions equaling all light portions transmitted through the thin film.

8. An apparatus comprising:
an optical source for producing divergent beams;
an integrating sphere for receiving the divergent beams and producing randomly reflected beams; and
a thin film coating coupled to a portion of the integrating sphere for receiving a portion of the randomly reflected beams;
wherein the thin film filter is transmissive for beams having incident angles less than a gate angle of the thin film filter and reflective for beams having incident angles greater than the gate angle of the thin film filter.

9. The apparatus of claim 8, wherein the optical source is located outside the integrating sphere.

10. The apparatus of claim 8, wherein the optical source is located inside the integrating sphere.

11. The apparatus of claim 8, wherein the integrating sphere has a highly randomly reflective interior that includes micro retro reflectors.

12. The apparatus of claim 8, wherein the thin film coating is formed from dielectric materials.

13. The apparatus of claim 8,
wherein an emergent solid angle $\Omega$ is defined as $2\pi \times (1 - \cos[\text{the gate angle}])$;
wherein an emergent area A is defined as an area of the thin film filter; and
wherein an emergent etendue is defined as $A \times \Omega$.

14. The apparatus of claim 13,
wherein the optical source has a source etendue; and
wherein the emergent etendue is less than the source etendue.

15. An apparatus, comprising:
an integrating sphere having a randomly reflective wall surrounding an interior space;
an optical source for introducing light beams into the interior space of the integrating sphere; and
a thin film coating disposed in an aperture of the wall, the thin film filter being transmissive of light beams having an incident angle less than a gate angle of the thin film filter and being reflected of light beams having incident angles greater than the gate angle of the thin film filter.

16. The apparatus of claim 15, wherein the optical source is located outside the integrating sphere.

17. The apparatus of claim 15, wherein the optical source is located inside the integrating sphere.

18. The apparatus of claim 15, wherein the integrating sphere has a highly randomly reflective interior that includes micro retro reflectors.

19. The apparatus of claim 15, wherein the thin film coating is formed from dielectric materials.

20. The apparatus of claim 15,
wherein an emergent solid angle $\Omega$ is defined as $2\pi \times (1 - \cos[\text{the gate angle}])$;
wherein an emergent area A is defined as an area of the thin film filter; and
wherein an emergent etendue is defined as $A \times \Omega$.

21. The apparatus of claim 20,
wherein the optical source has a source etendue; and
wherein the emergent etendue is less than the source etendue.

22. An apparatus comprising:
an integrating sphere having a highly randomly reflecting interior surface and an output port;
an optical source for introducing light onto the interior surface of the integrating sphere;

a transmissive substrate disposed at the output port of the integrating sphere, having an incident side facing inside of the integrating sphere and an exiting side facing outside the integrating sphere; and a thin film dielectric coating disposed on the incident side of the transmissive substrate;

wherein the thin film dielectric coating is transmissive for light incident upon the thin film dielectric coating at angles less than a gate angle and reflective for light incident upon the thin film dielectric coating for incident angles greater than the gate angle;

wherein an emergent solid angle $\Omega$ is defined as $2\pi \times (1-\cos[\text{the gate angle}])$;

wherein the transmissive substrate has an emergent area A;

wherein an emergent etendue is defined as $A \times \Omega$;

wherein the optical source has a source etendue; and wherein the emergent etendue is less than the source etendue.

* * * * *